A. TANZI.
SHAFT SET SCREW.
APPLICATION FILED AUG. 8, 1916.
1,220,024.
Patented Mar. 20, 1917.
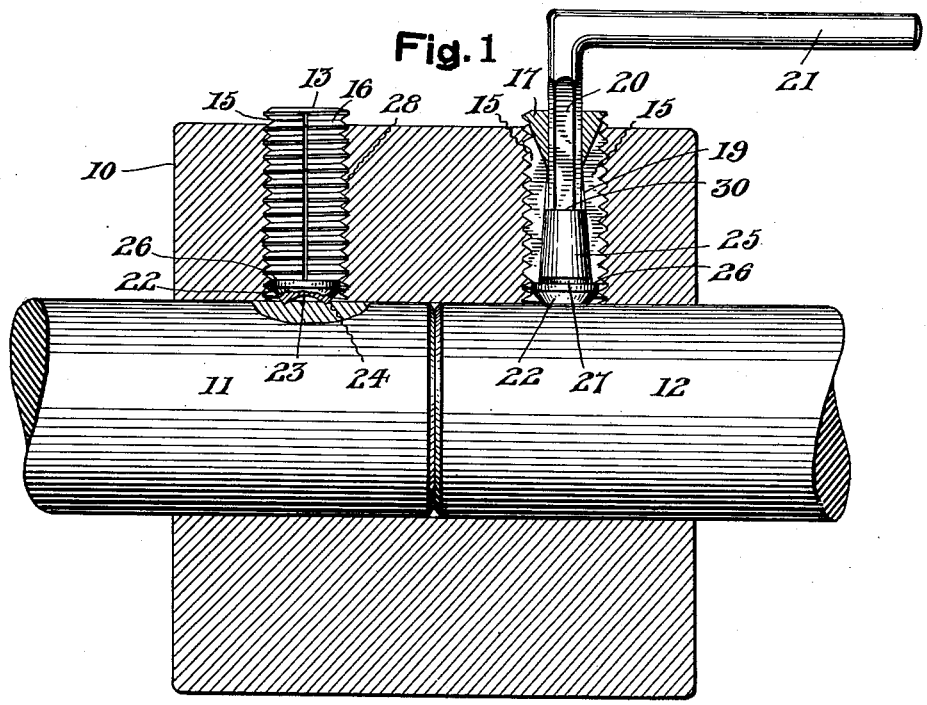
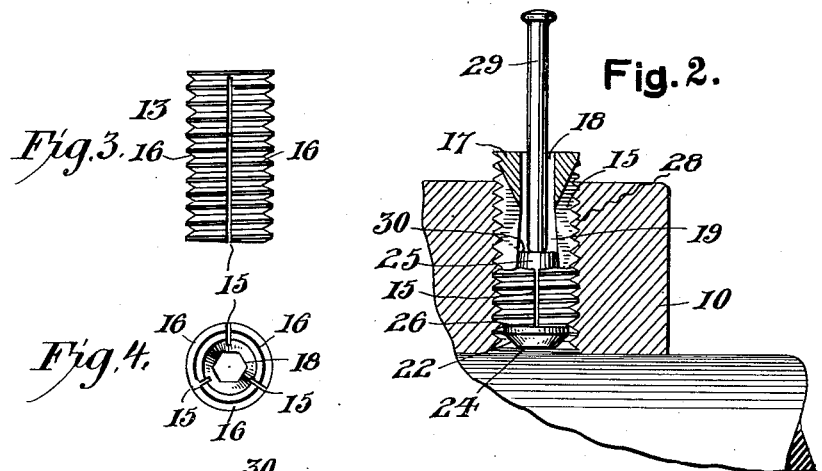
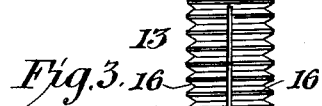
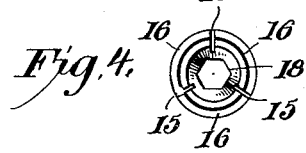
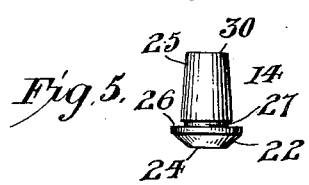
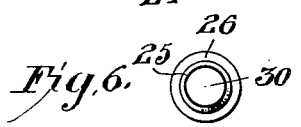
Inventor
A. Tanzi
By N. M. Wilson
Attorney

UNITED STATES PATENT OFFICE.

AURELIO TANZI, OF PHILADELPHIA, PENNSYLVANIA.

SHAFT SET-SCREW.

1,220,024.

Specification of Letters Patent.

Patented Mar. 20, 1917.

Application filed August 8, 1916. Serial No. 113,707.

*To all whom it may concern:*

Be it known that I, AURELIO TANZI, a subject of the King of Italy, residing at Philadelphia, in the county of Philadelphia and State of Pennsylvania, have invented certain new and useful Improvements in Shaft Set-Screws, of which the following is a specification.

This invention relates to certain new and useful improvements in shaft set screws.

The primary object of the invention is the provision of a locking set screw especially adapted for employment in connection with detachable securing members to be connected to shafts in such a manner that the connection cannot be loosened during the running vibrations of the shaft.

A further object of the device is the provision of a set screw adapted for taking the place of a locking key and groove in securing such members upon a shaft as pulleys, gears, connecting collars and similar devices.

A still further object of the invention is the provision of a set screw having a removable wedging point member adapted for securement in position engaging the work upon inserting the screw and releasable from the latter upon a partial removal of the screw whereby the screw may be readily extracted and a point removed from the work for future use when desired.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—

Figure 1 is a central longitudinal sectional view through a connecting collar illustrating two of my devices operatively employed therewith in securing two shaft sections in axial alinement, one of the devices being illustrated in section with the wrench applied thereto and the other in side elevation with the point member partially broken away.

Fig. 2 is a view similar to a portion of Fig. 1 with the device illustrated partly in section and partly in elevation, a point removing implement being illustrated therewith.

Fig. 3 is a side elevational view of the screw member of the device,

Fig. 4 is an end view of the same.

Fig. 5 is a side elevational view of the point member employed therewith, and Fig. 6 is an end view thereof.

It being understood that the device is designed for employment in connecting any members together found desirable, such as the securing of a collar upon a shaft, a device is herein illustrated in connection with a shaft coupler or collar 10 employed for maintaining two shafts 11 and 12 fixed together in axial alinement.

The device broadly consists of the screw 13 and a removable point 14 adapted for coöperation therewith, the said elements being illustrated separated from each other in Figs. 3 and 4 of the drawing respectively.

The screw 13 is provided with longitudinal slots 15 of any desired number and herein illustrated as dividing the screw in three sections 16 forming a head portion 17 at one end of the screw. A central bore 18 is longitudinally arranged through the screw 13 having a flaring portion 19 extending from the said head portion, it being understood that the bore 18 within the head 17 is formed angular in cross-section, herein illustrated as hexagonal, being adapted for the reception of the hexagonal shank 20 of a wrench 21 while the flaring portion 19 of the screw bore is of circular cross-section.

The point member 14 consists of a substantially frusto-conical base 22 having a central dished socket 23 semi-circular in cross-section and forming a circular cutting edge 24 at the smaller end of the base. The base 22 is provided with a slightly tapered shaft 25 adapted for wedging reception within the open end of the flared bore 19 of the screw 13, the base 22 providing an annular shoulder 26 adapted for engaging the end of the screw when the shaft 25 is wedgingly secured within the said tapered bore portion. An annular recess 27 is arranged in the shaft 25 adjacent the base shoulder 26.

In operation the member, such as the collar 10 which it is desired to secure to the cylindrical member or shaft is provided with a screw-threaded perforation 28 in which the screw 13 is inserted with the point member 14 loosely positioned in the flared bore 19 or the point 14 may be deposited in the perforation 28 freely resting upon the shaft in advance of the screw. A wrench 21 is then applied to the screw by inserting the shank 20 thereof into the squared bore 18 whereupon the screw is forced inwardly toward the work forcing the screw over the point shaft 25 into seating engagement with the shoulder 26 of the base 22. A tightening of the screw upon the point forces the cutting edge 24 of the point into the shaft as best illustrated in connection with the shaft 11 in Fig. 1 of the drawing while the shaft 25 forces the screw sections 16 outwardly in wedging engagement with the threads of the perforation 28. In this position the screw 13 is prevented from becoming loosened during the vibrations caused by the operation of the shaft in connection with which the same is employed.

For removing the screw 13 it is only necessary to insert the wrench 21 and slightly retract the screw whereupon any pointed instrument such as a nail 29 may be inserted in the bore 18 for engaging the reduced end 30 of the point 14 as illustrated in Fig. 2 of the drawing and whereupon a blow administered to the nail 29 releases the point from its wedging engagement with the screw, allowing the sections 16 to move inwardly releasing from engagement with the threads of the perforation 28 whereupon the screw may be easily retracted and removed by means of the wrench 21.

It will be seen that a device is provided which is easy and inexpensive to manufacture and by means of which members may be securely locked upon the shaft without the necessity of cutting grooves or key-ways in the members and inserting a key therein.

What I claim as new is:—

1. A set screw for shaft members, a point member removably arranged in wedging engagement with the set screw, the screw being provided with an instrument receiving longitudinal bore open at the upper end of the screw and communicating with the adjacent end of the point member.

2. A locking set screw having resilient side sections, a wedging point member removably arranged within the said sections, the set screw being provided with an axial bore adapted for the reception of an operating wrench or a removing instrument for the point member.

In testimony whereof I affix my signature.

AURELIO TANZI.